Sept. 2, 1952 H. C. HOGAN, JR 2,608,954
HYDRAULIC CONTROL VALVE WITH AUTOMATIC FOLLOW-UP
Filed Feb. 26, 1948 3 Sheets-Sheet 1
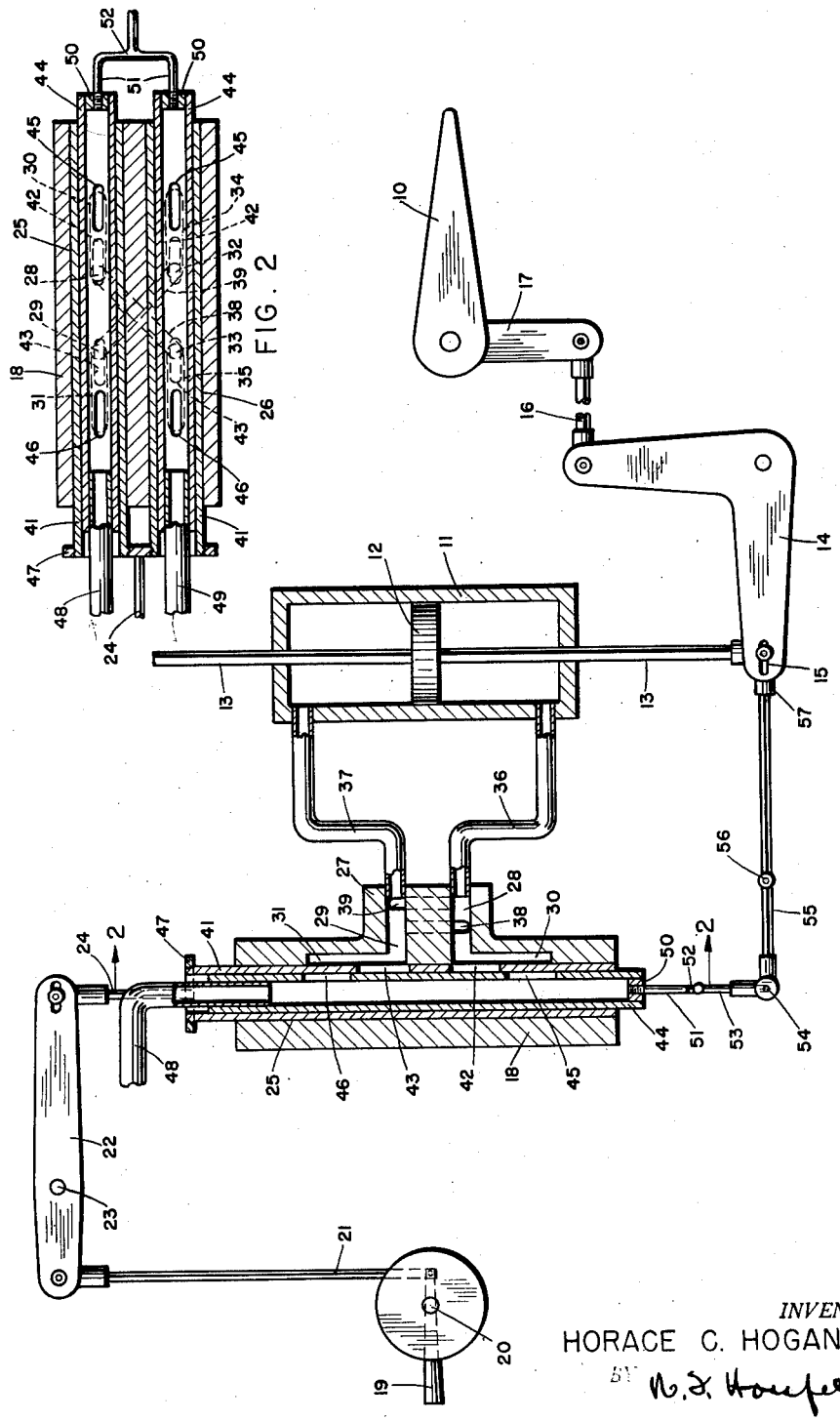
INVENTOR:
HORACE C. HOGAN, JR
ATT'Y.

INVENTOR:
HORACE C. HOGAN, JR.
BY N. T. Housfeld

ATT'Y.

Sept. 2, 1952  H. C. HOGAN, JR  2,608,954
HYDRAULIC CONTROL VALVE WITH AUTOMATIC FOLLOW-UP
Filed Feb. 26, 1948  3 Sheets-Sheet 3
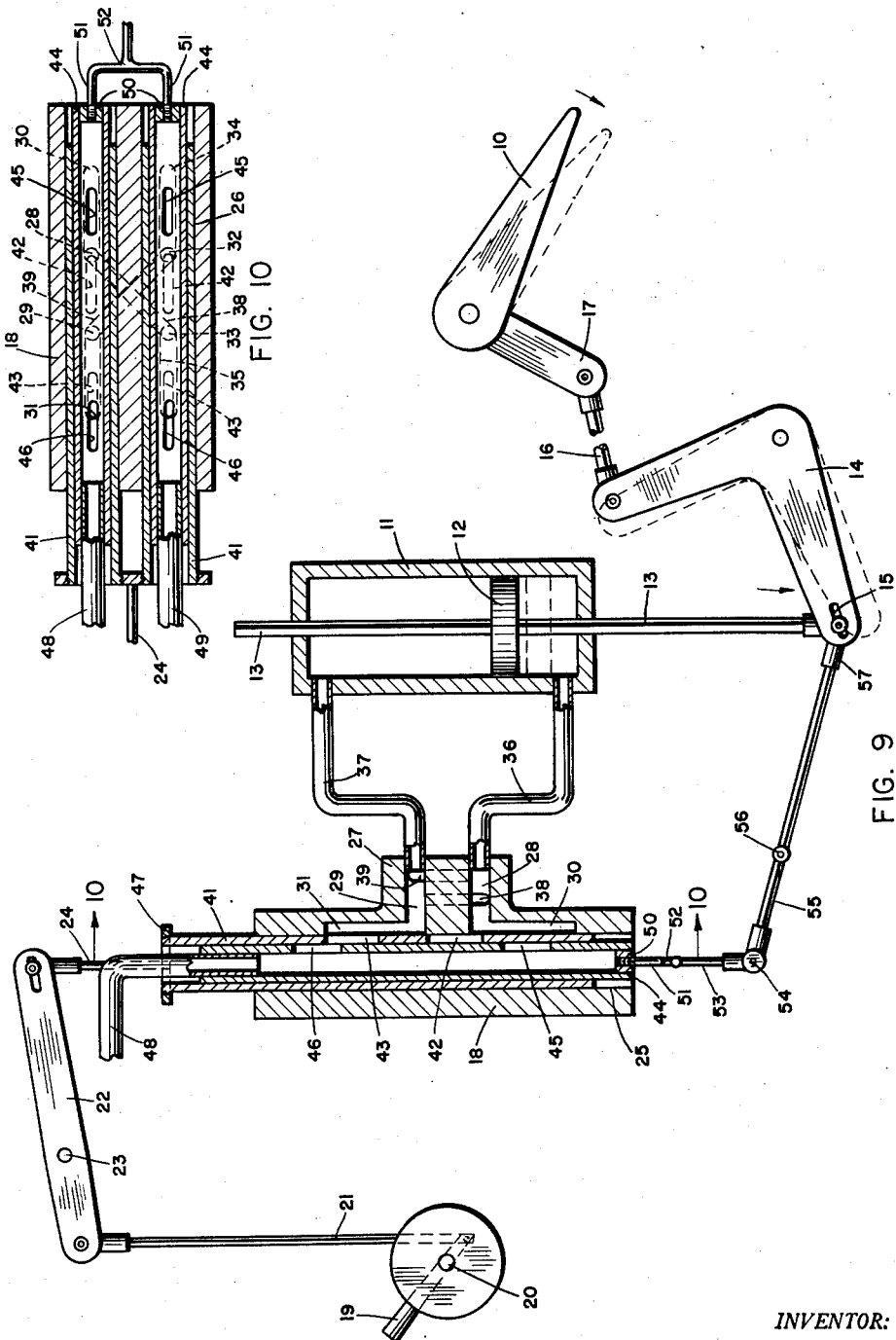
INVENTOR:
HORACE C. HOGAN, JR.
BY
ATT'Y.

Patented Sept. 2, 1952

2,608,954

UNITED STATES PATENT OFFICE 2,608,954

HYDRAULIC CONTROL VALVE WITH AUTOMATIC FOLLOW-UP

Horace C. Hogan, Jr., Charlestown, R. I.

Application February 26, 1948, Serial No. 11,233

5 Claims. (Cl. 121—41)

(Granted under the act of March 3, 1883, as amended April 30, 1928; 370 O. G. 757)

This invention relates in general to a control valve for hydraulic and other fluid controls and is more particularly described as a combined controlling valve and follow-up mechanism in a single compact unit for moving and holding a piston and cylinder operating structure in any desired position.

This valve has a wide application to military and commercial uses, and contemplates any fluid, liquid or gas, or a semi-solid paste as the pressure supplying medium. When combined with a cylinder and piston, some of the uses are: control of aircraft elevators, rudders, flaps, and landing gear; for rudders and steam valves on ships; to train and elevate large guns; controlling canal locks and heavy doors; for land vehicle stearing; raising and lowering heavy platforms and machines; and in general, to operate any movable fluid pressure constructions in which it is desired to hold or retain them in a locked position.

An important object of the invention is to provide a hand lever valve mechanism utilizing fluid under pressure to operate a piston in a cylinder for various controls and to lock or hold the piston in any set position until further operation of the hand lever.

A further object of the invention is to provide improved mechanism compactly arranged in a single unit for admitting fluid under pressure to an operating structure and to automatically cut off the fluid supply when a predetermined position or condition is reached, whereupon the operating structure is retained in place and requires similar actuation for any change of position or condition.

Still a further object of the invention is to provide a simple, relatively inexpensive, and compact valve which is easily installed and repaired, and is effective and efficient in operation.

Other objects of the invention will appear in the specification and will be apparent from the accompanying drawings, in which:

Fig. 1 is a sectional and plan view illustrating the application of the invention to the control of a ship's rudder;

Fig. 2 is a sectional view taken on the line 2—2 of Fig. 1;

Fig. 9 is a view similar to Fig. 1 showing the parts in a transient position; and Fig. 10 is a sectional view taken on the line 10—10 of Fig. 9.

Figure 3:
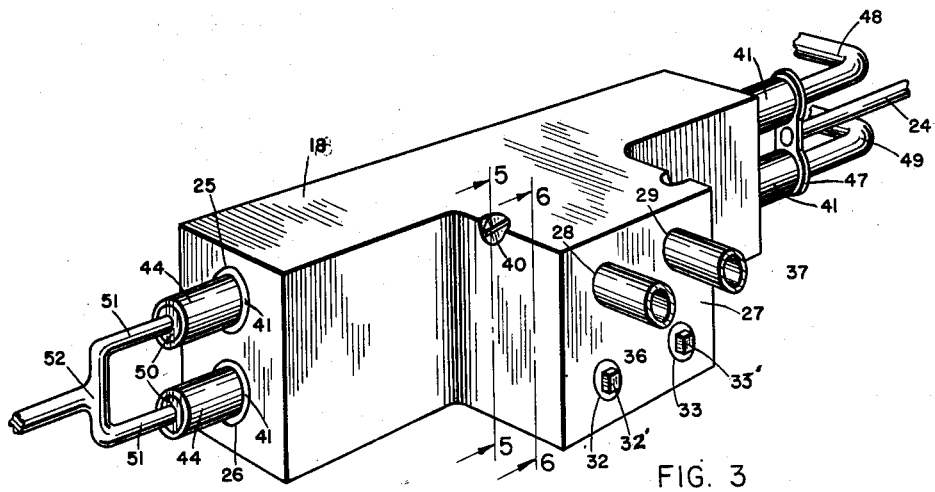
Fig. 3 is a perspective view of a valve block as shown in Fig. 1, containing valve parts of the operating mechanism.
Figure 4:
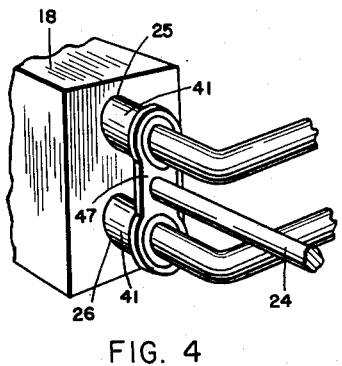
Fig. 4 is a perspective view of one end of the valve block and parts shown in Fig. 3.

Referring now more particularly to the drawings, a typical application of the invention to the operation of a ship's rudder 10 is shown and described. A cylinder 11 has a piston 12 movable therein in connection with a piston rod 13 extending from the closed ends of the cylinder. Between the piston rod and the rudder is an operating connection comprising a bell crank 14 connected at one end to the piston rod 13 by a slot 15, and at the other end pivoted to a link 16 which is pivoted to an arm 17 secured to and projecting from the rudder. The movement of the piston thereby causes a corresponding movement of the rudder.

Controlling and follow-up valve mechanism connected to the ends of this cylinder and to the piston 12 constitute the subject matter of this invention in which the valve mechanism is mounted in a block 18. The actuating means therefor comprises a hand lever 19 mounted upon a pivot 20 and connected by a link 21, with one end of an operating lever 22 having a mounting pivot 23 between its ends and connected by a link 24 to the valve mechanism.

In the valve block 18 which may be of metal or other suitable material, are two parallel and longitudinal bores 25 and 26 extending through the block. Bore 25 is designated the high pressure bore and bore 26 is the low pressure bore. At one side of the block is a projection 27 having two openings 28 and 29 extending from the outside at right angles into the bore 25. Extending oppositely along the bore 25 from each opening are recesses 30 and 31 respectively. For the low pressure bore 26 there are two similarly located openings 32 and 33 in the projection 27 with oppositely extending recesses 34 and 35, respectively, extending along the bore 26 and communicating with the openings.

Figure 5:
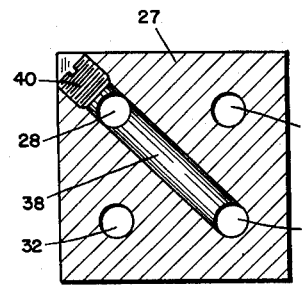
Fig. 5 is a sectional view taken on the line 5—5 of Fig. 3.
Figure 6:
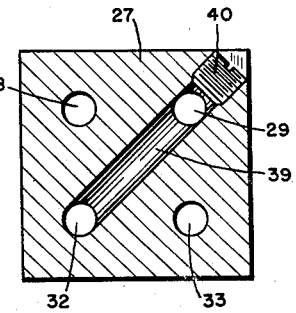
Fig. 6 is a sectional view taken on the line 6—6 of Fig. 3.
Figure 7:
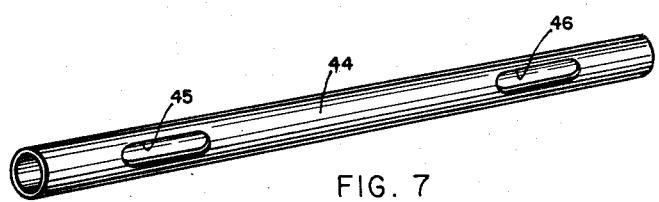
Fig. 7 is a perspective view of one of the inner valve pipes movable in the block of Fig. 3.
Figure 8:
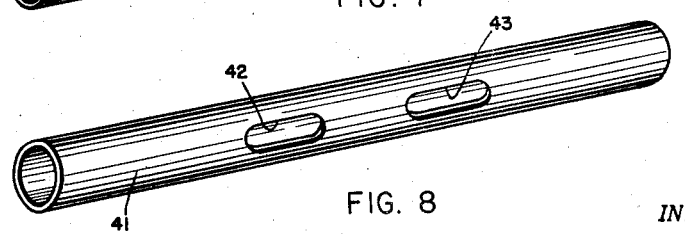
Fig. 8 is a perspective view of one of the outer valve pipes also movable in the block of Fig. 3.

The outer ends of the openings 32 and 33 are sealed with plugs 32' and 33' and the openings 28 and 29 are connected by pipes 36 and 37 respectively, with opposite ends of the cylinder 11. Within the projection 27 is a cross connecting passage 38 between high pressure opening 28 and low pressure 33 (Fig. 5), and another passage 39 between high pressure opening 29 and low pressure opening 32 (Fig. 6). These cross connecting passages may be made by boring inwardly from opposite sides or corners to intersect the designated openings and closing the outer end of each passage with a plug 40.

Fitting closely but slidably within each bore 25 and 26 is a valve tube 41 having two ports 42 and 43 at the same relative circumferential location but spaced apart longitudinally approximately the same distance as the openings 28 and 29, and 32 and 33. Fitting closely and slidably within each tube 41 is a follow-up valve tube 44 which has ports 45 and 46 at the same relative circumferential locations but spaced apart longitudinally a distance just slightly greater than the outer edges of the two ports 42 and 43 of the valve tube 41 and located to communicate with these ports respectively when either one of the tubes 41 and 44 is relatively moved.

Corresponding tubes 41 in the high and low pressure bores 25 and 26 are connected at one end for joint operation by a cross piece 47. Between the ends of the cross plate it is connected to the link 24 extending from the operating lever 22, so that the valve tubes 41 are directly operated by means of the hand lever 19. Connected to the adjacent ends of the inner follow-up tubes 44, and extending from this end of the valve tubes 41 are pipes 48 and 49, the former in the high pressure bore 25 and extending to a high pressure source of fluid supply, and the latter in the low pressure bore 26, and connected to a low pressure source of supply or to exhaust. The pipes 48 and 49 may slide in the tubes 44 or they may be flexible and move with the tubes; in either case the pipes are free from engagement with the outer valve tubes 41.

Tubes 41 are preferably longer than the block 18 so that the connected ends and the cross piece may extend beyond this end of the block. The other ends of the tubes 41 are open so that the corresponding ends of the follow-up valve tubes 44 may extend into or outwardly therefrom. This end of each tube 44 has a closing plug 50 therein, with a stem 51 extending therefrom joining it to a common connector 52.

A link 53 is pivoted at one end to the connector 52 and the other end is connected by a pivot 54 with one end of a follow-up lever 55. This lever is mounted on a pivot 56 intermediate its ends, and the other end is connected by a pivoting and sliding connector 57 with the same end of the bell-crank lever which is attached to the piston rod 13.

With this construction the operation is best described in steps, although the actual performance is continuous. With the hand lever 19 in central or neutral position, the rudder (or any operated member) is also in neutral or central position. The hand lever is turned in one direction or the other, and the connections are arranged to produce a corresponding movement of the rudder and to lock it in the position for which the lever is set.

In the central or neutral position, as shown in Fig. 1, the valve tubes 41 are centered with respect to their ports 42 and 43 and the recesses 30 and 31 of the high pressure bore 25 and the recesses 34 and 35 of the low pressure bore 26.

Movement of the hand lever 19 upwardly will first produce a corresponding upward movement of tubes 41 which will uncover the ports 46 in the tubes 44 and open the valves as represented in Figs. 9 and 10. The path of the high pressure fluid is from the high pressure pipe 48, through high pressure tube 41, valve port 46, valve port 43 of tube 41, recess 31 of block 18, opening 29, pipe 37, to the top of cylinder 11, acting upon piston 12 to push it downwardly. At the same time the ports 45 and 42 from the high pressure tube 44 are closed, and a return low pressure or exhaust connection is established from the low pressure side of piston 12, through pipe 36, opening 28, cross-connecting passage 38 to the low pressure opening 33, in block 18 thence through recess 35, ports 43 and 46 of the low pressure pipes 41 and 44 in low pressure bore 26, and outwardly through pipe 49 to the low pressure supply or exhaust. At this time the ports 45 and 42 in the low pressure bore are also closed the same as in the high pressure bore, as shown in Fig. 10.

At the next stage of movement, as represented in broken outline in Fig. 9, the downward movement of the piston has caused the desired movement of the rudder 10 and the movement of the bell-crank 15 has caused the continued movement of the follow-up valve tubes 44 in both high and low pressure bores 25 and 26. This movement gradually closes the valve openings by moving the tubes 44 so the ports 46 do not register with ports 43 of the tubes 41. This closes the openings and ports in the valve block from both ends of the cylinder 11 so that the fluid under pressure is entrapped and equalized on both sides of the piston 12, holding it in any position as directed, and predetermined by the movement of the hand lever 19 which therefor acts as an indicator of the position of the rudder.

From this or any other position (excepting the end limits) the hand lever 19 may be turned in either direction to move the rudder accordingly. If it is continued in the same direction the ports 46 and 43 in the ends of the tubes 44 and 41 will be used, and if the lever is reversed the ports 45 and 42 in the tubes will be connected to the ends of the cylinder 11 in the reverse direction and through the other cross-connecting passage 39, to move the piston and the rudder in the opposite direction.

In any movement of the piston, the first movement of the hand lever opens the proper valves to the cylinder from the high and low pressure connections, causing a positive movement of the rudder (or other controlled member). This causes a pressure pinching off or closing movement of the follow-up tubes 44 which gradually closes the valves and entraps fluid under pressure at both sides of the piston to hold it and the rudder in any set position until the hand lever is changed.

While an application of this valve has been thus described in detail, it should be regarded as an example and not as a limitation of the invention, as various different applications of the construction may be used, and various changes in the construction, combination and arrangement of the ports may be made without departing from the spirit and scope of the invention.

The invention described herein may be manufactured and used by or for the Government of the United States of America, for governmental purposes without the payment of any royalties thereon or therefor.

I claim:

1. In a control valve, a block having separate bores therein, a pair of tubes one within the other in each bore, the inner tube of one pair connected to pressure and the inner tube of another pair connected to exhaust, each tube having spaced ports movable into and out of register with those of its companion tube, the block having spaced recesses along each bore and openings extending therefrom, cross connections between opposite openings, plugs closing the outer ends of the openings from one bore, means for moving one tube of each pair to register the ports of both tubes of both bores to provide fluid pressure and return exhaust passages through the unplugged openings and cross connection of the block, and means to move the other tube of each pair to close communication through said ports.

2. In a control valve, a block having high and low pressure bores therein, a pair of tubes one within the other in each bore, each tube having spaced ports movable into and out of register with those of the other tube, the block having two recesses along each bore and openings extending outwardly therefrom, cross connections between the opposite high and low pressure openings, means to close the outer ends of the low pressure openings, tubular connections with the openings of the high pressure bore to provide fluid pressure and return passages through the block, a high pressure connection to one of the inner tubes, a low pressure connection with the other inner tube, means to move the outer tube together to register the ports of both tubes in each bore to open pressure communications through the block, and means to move the inner tubes together to close the port communications.

3. The combination with a cylinder and a piston movable therein connected to a direction change mechanism, of an operating lever, pressure supply and exhaust means, and a control valve actuated by the lever to move the piston by said pressure supply, comprising a valve block having high and low pressure bores therein, the block having openings and recesses along each bore to which the openings extend, means connecting two openings from the tubes to opposite ends of the cylinders, means closing the outer ends of two openings in the block, cross connecting passages in the block extending from the two connected openings oppositely to the two closed openings, a pair of tubes one within the other in each bore, each tube having spaced ports movable into and out of register with those of the other tube of the pair, the ports registering with the recesses to provide pressure and exhaust communication with the cylinder, means connecting one of the inner tubes to the pressure supply and the other to the exhaust means, a connection between the operating lever and both outer valve tubes, and a connection between the piston and both of the inner tubes to move the ports thereof out of register with those of the outer tubes.

4. In a control valve, a block having a pair of bores, a pair of tubes for each bore, one tube movable inside of the other and the latter in the bore, fluid pressure and exhaust means connected to the inner tubes, spaced ports in each tube movable into register with those of the other tube, a pair of openings spaced apart and extending from each bore, cross connections from each opening of one bore to the opposite opening of the other bore, means extending from the openings of one bore for conveying fluid pressure and exhaust in both directions to and from the valve, and means plugging the openings of the other bore to utilize the cross connections for conveying fluid pressure to tubes of the said other bore depending upon the direction of fluid pressure flow through the valve.

5. In a control valve mechanism, a cylinder and piston structure for direction change apparatus, a valve block having longitudinal bores and spaced openings communicating laterally with each bore, connections from the openings of the bores with the opposite ends of the cylinder, a pair of tubes for each bore, one tube movable within the other and the latter in the bore, each tube having two ports movable into and out of register with corresponding ports of the other and with said openings, pressure supply and discharge means each connected to one of the inner tubes, means for moving the outer tubes to register the ports in both tubes with one or the other of said openings to actuate the piston in the cylinder, means connecting the direction change apparatus piston with the inner tubes to move them in the same direction as the outer tubes have been moved and thereby gradually to close the tube ports that have been opened, and cross connection between the openings of the two bores to direct the pressure and discharge through the valve tubes in accordance with the desired movement of the piston in the cylinder, and the gradual closing of the valves entrapping pressure fluid under pressure on both sides of the piston and holding the direction change apparatus in any desired set position.

HORACE C. HOGAN, JR.

REFERENCES CITED

The following references are of record in the file of this patent:

UNITED STATES PATENTS

| Number | Name | Date |
|---|---|---|
| 556,419 | James | Mar. 17, 1896 |
| 591,768 | Kaselowsky | Oct. 12, 1897 |
| 1,365,347 | Schneider | Jan. 11, 1921 |
| 1,608,203 | Dewandre | Nov. 23, 1926 |
| 2,064,379 | Kundig | Dec. 15, 1936 |
| 2,140,095 | Theed | Dec. 13, 1938 |
| 2,225,952 | Clay | Dec. 24, 1940 |
| 2,338,021 | Bennett | Dec. 28, 1943 |
| 2,352,344 | Rockwell | June 27, 1944 |
| 2,456,211 | Nardone | Dec. 14, 1948 |
| 2,556,746 | Ashton | June 12, 1951 |

FOREIGN PATENTS

| Number | Country | Date |
|---|---|---|
| 4,233 | Great Britain | of 1875 |